(12) United States Patent
Wang et al.

(10) Patent No.: US 11,132,076 B2
(45) Date of Patent: Sep. 28, 2021

(54) TOUCH SUBSTRATE, METHOD FOR MANUFACTURING THE SAME AND TOUCH DEVICE

(71) Applicants: HEFEI XINSHENG OPTOELECTRONICS TECHNOLOGY CO., LTD., Anhui (CN); BOE TECHNOLOGY GROUP CO., LTD., Beijing (CN)

(72) Inventors: Qingpu Wang, Beijing (CN); Zhenzhong Fang, Beijing (CN); Xiaoyue He, Beijing (CN); Li Yin, Beijing (CN); Zhi Zhang, Beijing (CN)

(73) Assignees: HEFEI XINSHENG OPTOELECTRONICS TECHNOLOGY CO., LTD., Anhui (CN); BOE TECHNOLOGY GROUP CO., LTD., Beijing (CN)

( * ) Notice: Subject to any disclaimer, the term of this patent is extended or adjusted under 35 U.S.C. 154(b) by 114 days.

(21) Appl. No.: 16/632,170

(22) PCT Filed: Jul. 22, 2019

(86) PCT No.: PCT/CN2019/097132
§ 371 (c)(1),
(2) Date: Jan. 17, 2020

(87) PCT Pub. No.: WO2020/020103
PCT Pub. Date: Jan. 30, 2020

(65) Prior Publication Data
US 2021/0223877 A1    Jul. 22, 2021

(30) Foreign Application Priority Data
Jul. 27, 2018    (JP) .......................... 201810847392.3

(51) Int. Cl.
*G06F 3/045* (2006.01)
*G06F 3/041* (2006.01)

(52) U.S. Cl.
CPC .... G06F 3/041 (2013.01); *G06F 2203/04103* (2013.01)

(58) Field of Classification Search
CPC ..................... G06F 3/041; G06F 2203/04103
See application file for complete search history.

(56) References Cited

U.S. PATENT DOCUMENTS 10,168,846 B2    1/2019   Shi et al.
2014/0340364 A1  11/2014  Tang et al.
(Continued)

FOREIGN PATENT DOCUMENTS

CN    202649968 U    1/2013
CN    206490707 U    9/2017
(Continued)

OTHER PUBLICATIONS

First office action dated Jun. 22, 2020 for application No. CN201810847392.3 with English translation attached.

*Primary Examiner* — Adam R. Giesy
(74) *Attorney, Agent, or Firm* — Nath, Goldberg & Meyer; Joshua B. Goldberg (57) ABSTRACT

A touch substrate, a manufacturing method thereof and a touch device are provided. The touch substrate includes a touch area and a border area surrounding the touch area, wherein the border area includes a light filtering sub-area for transmitting light of a predetermined wavelength band and a light shielding sub-area surrounding the light filtering sub-area, and a difference between lightness of the light shielding sub-area and lightness of the light filtering sub-area is less than 3.6.

20 Claims, 4 Drawing Sheets

A-A

(56) References Cited

U.S. PATENT DOCUMENTS

2016/0337564 A1   11/2016  Fournier et al.
2017/0255816 A1*  9/2017  Gao ................... G06K 9/00046

FOREIGN PATENT DOCUMENTS

| | | |
|---|---|---|
| CN | 107241466 A | 10/2017 |
| CN | 107637062 A | 1/2018 |
| EP | 2103988 A2 | 9/2009 |
| GN | 103472941 A | 12/2013 |
| GN | 104765505 A | 7/2015 |
| JP | 2017097042 A | 6/2017 |

* cited by examiner

TOUCH SUBSTRATE, METHOD FOR MANUFACTURING THE SAME AND TOUCH DEVICE

CROSS-REFERENCE TO RELATED APPLICATIONS

This is a National Phase Application filed under 35 U.S.C. 371 as a national stage of PCT/CN2019/097132, filed Jul. 22, 2019, an application claiming the priority of Chinese Application No. 201810847392.3, filed on Jul. 27, 2018, the contents of each of which is incorporated herein in their entirety by reference.

TECHNICAL FIELD

The present disclosure relates to the field of touch technology, and particularly relates to a touch substrate, a method for manufacturing the same, and a touch device.

BACKGROUND

With the development of science and technology, touch screens are increasingly and widely used. An infrared (IR) filtering hole in which a distance sensor or a light sensor is disposed is generally provided in a border area of each of the touch screens so as to detect a distance or a brightness of an external environment by using infrared rays. People have an increasing requirement on an appearance of a touch screen, therefore a color of the infrared filtering hole in the border area of the touch screen needs to be consistent with a color of the border area of the touch screen, thereby hiding the infrared filtering hole better.

SUMMARY

According to an aspect of the present application, a touch substrate is provided. The touch substrate includes a touch area and a border area surrounding the touch area, wherein the border area includes a light filtering sub-area for transmitting light of a predetermined wavelength band and a light shielding sub-area surrounding the light filtering sub-area. A difference between lightness of the light shielding sub-area and lightness of the light filtering sub-area is less than 3.6.

In an embodiment, the border area of the touch substrate includes a substrate, a light shielding layer and a light filtering ink layer that are on the substrate. The light shielding layer is in the light shielding sub-area, and a through hole is at a position in the light shielding layer corresponding to the light filtering sub-area. The light filtering ink layer is on a side of the light shielding layer distal to the substrate, and an orthographic projection of the through hole on the substrate is inside an orthographic projection of the light filtering ink layer on the substrate. A difference between lightness of the light shielding layer and lightness of the light filtering ink layer is less than 3.6.

In an embodiment, the difference between the lightness of the light shielding layer and the lightness of the light filtering ink layer ranges from 0.5 to 2.

In an embodiment, the lightness of the light filtering ink layer ranges from 23 to 24.5, and the lightness of the light shielding layer ranges from 24 to 25.

In an embodiment, the light shielding layer has a thickness in a range from 1.5 μm to 2.3 μm.

In an embodiment, the light filtering ink layer is in the through hole of the light shielding layer and extends onto a surface of the light shielding layer distal to the substrate.

In an embodiment, the touch substrate further includes a reflection enhancement layer. The reflection enhancement layer is between the light shielding layer and the light filtering ink layer. The reflection enhancement layer is at least in the through hole of the light shielding layer. The orthographic projection of the through hole on the substrate is inside an orthographic projection of the reflection enhancement layer on the substrate.

In an embodiment, a reflectance of the reflection enhancement layer ranges from 1% to 15%.

In an embodiment, the touch area of the touch substrate includes: a touch electrode layer on the side of the substrate; an insulation layer on a surface of the touch electrode layer distal to the substrate; and the reflection enhancement layer on a surface of the insulation layer distal to the substrate. The orthographic projection of the reflection enhancement layer on the substrate overlaps with an orthographic projection of the touch area and the border area on the substrate.

In an embodiment, the touch area of the touch substrate includes a touch electrode layer on the side of the substrate; the reflection enhancement layer on a surface of the touch electrode layer distal to the substrate, the orthographic projection of the reflection enhancement layer on the substrate overlapping with an orthographic projection of the touch area and the border area on the substrate; and an insulation layer on a surface of the reflection enhancement layer distal to the substrate.

In an embodiment, a material for the insulation layer includes photoresist.

In an embodiment, the insulation layer has a thickness in a range from 1 μm to 3 μm.

According to an aspect of the present application, a touch device including the touch substrate according to any one of the embodiments described above.

According to an aspect of the present application, a method for manufacturing a touch substrate is provided. The touch substrate includes a touch area and a border area surrounding the touch area. The method includes: forming a light filtering sub-area for transmitting light of a predetermined wavelength band and a light shielding sub-area surrounding the light filtering sub-area in the border area. The method further include setting a difference between lightness of the light shielding sub-area and lightness of the light filtering sub-area to be less than 3.6.

In an embodiment, forming the light filtering sub-area for transmitting light of the predetermined wavelength band and the light shielding sub-area surrounding the light filtering sub-area in the border area includes: providing a substrate; forming a light shielding layer on a side of the substrate in the border area, wherein the light shielding layer is formed in the light shielding sub-area and a through hole is formed at a position of the light shielding layer corresponding to the light filtering sub-area; and forming a light filtering ink layer on a side of the light shielding layer distal to the substrate, wherein an orthographic projection of the through hole on the substrate is inside an orthographic projection of the light filtering ink layer on the substrate. A difference between lightness of the light shielding layer and lightness of light filtering ink layer is less than 3.6.

In an embodiment, the difference between the lightness of the light shielding layer and the lightness of the light filtering ink layer ranges from 0.5 to 2.

In an embodiment, the light filtering ink layer is formed to fill in the through hole of the light shielding layer and extend onto a surface of the light shielding layer distal to the substrate.

In an embodiment, a reflection enhancement layer is formed between the light shielding layer and the light filtering ink layer, such that the reflection enhancement layer is formed to fill in the through hole of the light shielding layer and the orthographic projection of the through hole on the substrate is inside an orthographic projection of the reflection enhancement layer on the substrate.

In an embodiment, the method further includes: forming a touch electrode layer on the side of the substrate in the touch area; forming an insulation layer on a surface of the touch electrode layer distal to the substrate; and forming the reflection enhancement layer on a surface of the insulation layer distal to the substrate, such that the orthographic projection of the reflection enhancement layer on the substrate overlaps with an orthographic projection of the touch area and the border area on the substrate.

In an embodiment, the method further includes: forming a touch electrode layer on the side of the substrate in the touch area; forming the reflection enhancement layer on a surface of the touch electrode layer distal to the substrate, such that the orthographic projection of the reflection enhancement layer on the substrate overlaps with an orthographic projection of the touch area and the border area on the substrate; and forming an insulation layer on a surface of the reflection enhancement layer distal to the substrate.

BRIEF DESCRIPTION OF THE DRAWINGS

The accompanying drawings, which facilitate a further understanding of the present disclosure and constitute a part of the specification, are used in conjunction with the following specific embodiments to explain the present disclosure, but are not intended to limit the present disclosure. In the drawings.

DETAILED DESCRIPTION

The embodiments of the present disclosure will be described in detail below with reference to the accompanying drawings. It is to be understood that the embodiments described herein are merely used for describing and explaining the present disclosure rather than limiting of the present disclosure.

In an existing touch screen, a large difference exists between a color of an infrared filtering hole and a color of a border area of the touch screen, and as a result, the infrared filtering hole cannot be hidden well.

Figure 1:
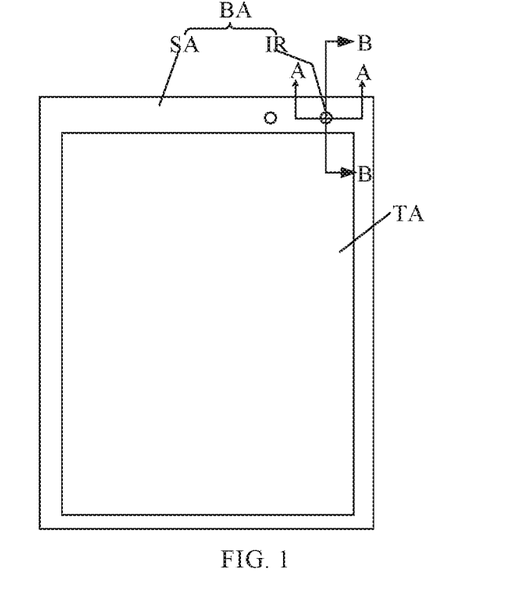
FIG. 1 is a top view showing a touch substrate according to an embodiment of the present disclosure.
Figure 2:
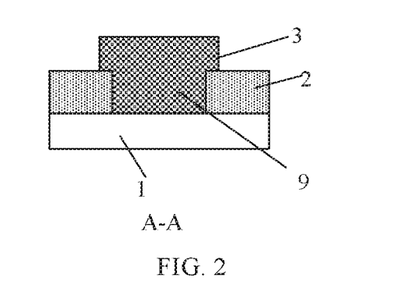
FIG. 2 is a cross-sectional view of a border area along line AA in FIG. 1 in a case where the border area has a first stacked structure.

FIG. 1 is a top view showing a touch substrate according to an embodiment of the present disclosure. As shown in FIG. 1, the touch substrate includes a touch area TA and a border area BA surrounding the touch area TA. The border area BA includes a light filtering sub-area IR for filtering light of a predetermined wavelength band and a light shielding sub-area SA surrounding the light filtering sub-area IR. FIG. 2 is a cross-sectional view of the border area along line AA in FIG. 1 in a case where the border area has a first stacked structure. As shown in FIG. 2, the touch substrate includes a substrate 1, a light shielding layer 2 on the substrate 1, and a light filtering ink layer 3 disposed on a side of the light shielding layer 2 distal to the substrate 1. The light shielding layer 2 and the light filtering ink layer 3 are both located in the border area BA. The light shielding layer 2 is located in the light shielding sub-area SA, and a through hole 9 is formed in a portion of the light shielding layer 2 corresponding to the light filtering sub-area IR. The light filtering ink layer 3 is located on a surface of the light shielding layer 2 distal to the substrate 1 and fills in the through hole 9. In an embodiment, an orthographic projection of the light filtering ink layer 3 on the substrate at least covers an orthographic projection of light filtering sub-area IR on the substrate, or an orthographic projection of the through hole 9 on the substrate 1 is located inside the orthographic projection of the light filtering sub-area IR on the substrate 1. The light filtering ink layer 3 covers the through hole 9 and only a portion of the light shielding layer, A difference between lightness of the light shielding sub-area SA and lightness of the light filtering sub-area IR is less than 3.6.

The substrate 1 may be a glass substrate or a Polyimide (PI) substrate. The light filtering ink layer 3 may cover the entire border area BA. Alternatively, the orthographic projection of light filtering ink layer 3 on the substrate 1 overlaps with an orthographic projection of the entire border area BA on the substrate. The substrate 1 may be provided with structures such as signal lines and driving chips thereon, and the light shielding sub-area SA is an area for shielding the structures such as the signal lines and the driving chips. The light of the predetermined wavelength band may be infrared light having a wavelength of 800 nm or more. The lightness is an L value on a luminance axis in CIE Lab color coordinates, and the lightness ranges from 0 to 100, where 0 represents the black color, 100 represents the white color, and the values from 0 to 100 represent various gray colors.

It should be noted that in the present disclosure, the "lightness difference" between two areas (or the "lightness difference" between two structures) refers to an absolute value of the difference between lightness of a first area minus lightness of a second area (or the difference between lightness of a first structure minus lightness of a second structure). It should be further noted that the color hues of the light filtering sub-area IR and the light shielding sub-area SA are identical to each other, that is, values of a and b of the color of the light filtering sub-area IR in the CIE Lab color coordinates are identical or substantially identical to values of a and b of the color of the light shielding sub-area SA in the CIE Lab color coordinates, respectively.

In electronic devices such as a mobile phone having a touch substrate, a sensor may be located at a position corresponding to the light filtering sub-area. IR. According to light passing through the light filtering sub-area IR, the sensor may detect brightness of the external environment, acquire an external image, or detect a distance from a user to the touch substrate. The light filtering ink layer 3 may be located at least in the light filtering sub-area IR of the border area BA for filtering light incident from the external to the light filtering sub-area IR (or the sensor).

In an existing touch substrate, generally the lightness difference between the lightness of the light filtering ink layer and the lightness of the light shielding layer is greater than 3.6. Human eyes can distinguish the difference between the color of the light filtering sub-area and the color of the light shielding sub-area based on the lightness difference. However, in the touch substrate according to the embodiments of the present disclosure, the difference between the lightness of the light shielding sub-area SA and the lightness of the light filtering sub-area IR is less than 3.6, therefore it is difficult for human eyes to distinguish the difference between the colors of the light filtering sub-area IR and the light shielding sub-area SA, thereby realizing the color uniformity in the border area BA and providing better visual experience to users.

In an embodiment of the present disclosure, the lightness of the light shielding layer 2 may be set to be similar to the lightness of the light filtering ink layer 3, so that the lightness of the light shielding sub-area SA is substantially the same as the lightness of the light filtering sub-area IR.

According to the embodiment of the present disclosure, since the difference between the lightness of the light shielding layer 2 and the lightness of the light filtering ink layer 3 is less than 3.6, the difference between the lightness of the light shielding sub-area SA and the lightness of the light filtering sub-area IR is less than 3.6.

In general, the light filtering ink layer 3 has a certain lightness to achieve the light filtering effect of the light filtering ink layer 3. Small difference between the lightness of the light shielding layer 2 and the lightness of the light filtering ink layer 3 may lead to the great lightness of the light shielding layer 2. In this case, in order to ensure the light shielding effect of the light shielding layer 2, the light shielding layer 2 is required to have an increased thickness, which may increase the whole thickness of touch substrate. In order to prevent this, in an embodiment, the difference between the lightness of the light shielding layer 2 and the lightness of the light filtering ink layer 3 ranges from 0.5 to 2, so that the difference between the lightness of the light filtering ink layer 3 and the lightness of the light shielding layer 2 can be reduced further. In addition, the difference between the lightness of the light shielding layer 2 and the lightness of the light filtering ink layer 3 ranges from 0.5 to 2, which not only achieves the filtering effect of the light filtering ink layer 3, but also prevents the lightness of the light shielding layer 2 from being too large, therefore the light shielding layer 2 does not need to have an increased thickness to achieve the light-shielding effect of the light shielding layer 2.

For example, the lightness of the light filtering ink layer 3 ranges from 23 to 24.5, and the lightness of the light shielding layer 2 ranges from 24 to 25. For example, the lightness of the light shielding layer 2 is 24.5.

In an embodiment, the thickness of the light shielding layer 2 ranges from 1.5 µm to 2.3 µm in order to ensure that the light shielding layer 2 can still have a good light shielding effect after the lightness of the light shielding layer 2 is adjusted. For example, the light shielding layer 2 may have a thickness of 2.3 µm.

Figure 3:
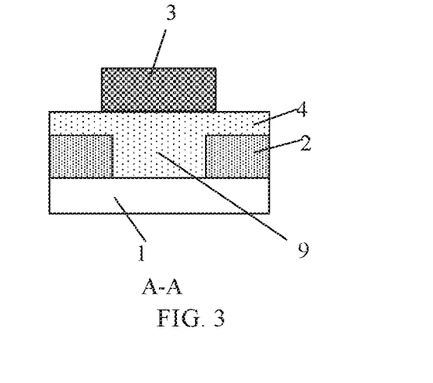
FIG. 3 is a cross-sectional view of the border area along line AA in FIG. 1 in a case where the border area has a second stacked structure.

FIG. 3 is a cross-sectional view of the border area along line AA in FIG. 1 in a case where the border area has a second stacked structure. Generally the lightness of the light shielding layer 2 is greater than the lightness of the light filtering ink layer 3. In this case, in order to further reduce the difference between the color of the light filtering sub-area JR and the color of the light shielding sub-area. SA, a reflection enhancement layer 4 is disposed between the light shielding layer 2 and the light filtering ink layer 3 for increasing the brightness of the light reflected by the light filtering sub-area FR, as shown in FIG. 3. The reflection enhancement layer 4 is located in the through hole 9 of the light shielding layer 2 and extends onto a surface of the light shielding layer 2 distal to the substrate 1. The light filtering ink layer 3 is located on a surface of the reflection enhancement layer 4 distal to the substrate 1.

It should be noted that the reflection enhancement layer 4 should not be too thick in order to ensure that at least a part of light can still irradiate the light filtering ink layer 3 from the substrate 1 and be reflected by the light filtering ink layer 3.

In an electronic device with the touch substrate, the light shielding layer 2 and the light filtering ink layer 3 are both located on a side of the substrate 1 distal to a user. When viewed from the user, the lightness of the light shielding sub-area SA is equal to lightness of a combination of the light shielding layer 2 and the substrate 1, and the lightness of the combination is related to an intensity of the external light reflected by the light shielding sub-area SA. The lightness of the light filtering sub-area. IR is equal to lightness of a combination of the light filtering ink layer 3, the reflection enhancement layer 4, and the substrate 1, and the lightness of this combination is related to an intensity of the external light reflected by the light filtering sub-area IR. The arrangement of the reflection enhancement layer 4 is beneficial to increasing the reflection of the external light by the light filtering sub-area IR so as to increase the lightness of the light filtering sub-area IR. In a case where the lightness of the light filtering ink layer 3 is smaller than the lightness of the light shielding layer 2, the arrangement of the reflection enhancement layer 4 is beneficial to reducing the difference between the lightness of the light filtering sub-area IR and the lightness of the light shielding sub-area SA.

The lightness of the light filtering sub-area IR tends to be more consistent with the lightness of the light shielding sub-area SA by setting the reflectance and thickness of the reflection enhancement layer 4. In an embodiment, the reflection enhancement layer 4 includes any one or more of a silicon oxynitride layer, a silicon oxide layer, and a niobium pentoxide layer. In an embodiment, the reflectance of the reflection enhancement layer 4 ranges from 1% to 15%, e.g., 7%±1%. In an embodiment, the reflection enhancement layer 4 is a silicon oxynitride layer with a thickness in a range from 800 Å to 1000 Å, e.g., 900 Å.

Figure 4:
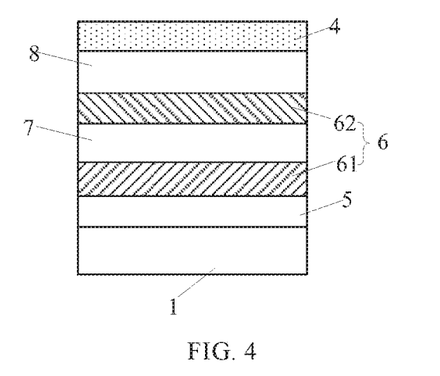
FIG. 4 is a schematic diagram showing a stacked structure of a touch area of a touch substrate according to an embodiment of the present disclosure.

FIG. 4 is a schematic diagram showing a stacked structure of a touch area of a touch substrate according to an embodiment of the present disclosure. As shown in FIGS. 3 and 4, in addition to that the reflection enhancement layer 4 is arranged to overlap with the light filtering sub-area IR, the reflection enhancement layer 4 may further cover the border area BA and the touch area TA. Alternatively, in addition to that an orthographic projection of the reflection enhancement layer 4 on the substrate 1 is arranged to overlap with an orthographic projection of the light filtering sub-area IR on the substrate 1, the orthographic projection of the reflection enhancement layer 4 on the substrate 1 may further overlap (e.g., completely overlap) with an orthographic projection of the border area BA and the touch area TA on the substrate 1. In an embodiment, the reflection enhancement layer 4 in the border area BA and the reflection enhancement layer 4 in the touch area TA are formed as one piece in a same step. The manufacturing difficulty can be reduced in a case where the reflection enhancement layer 4 is arranged to completely cover both the border area BA and the touch area TA, as compared with the case that the reflection enhancement layer 4 only covers the light filtering sub-area IR.

The touch substrate further includes a touch electrode layer 6 located in the touch area TA and between the substrate 1 and the reflection enhancement layer 4. The touch electrode layer 6 may include a first electrode layer 61 and a second electrode layer 62 located on a side of the first electrode layer 61 distal to the substrate 1. One of the first electrode layer 61 and the second electrode layer 62 is a touch driving electrode layer, and the other of the first electrode layer 61 and the second electrode layer 62 is a touch sensing electrode layer. A first insulation layer 5 is formed between the first electrode layer 61 and the substrate 1. A second insulation layer 7 is formed between the first electrode layer 61 and the second electrode layer 62. A third insulation layer 8 is formed on a side of the second electrode layer 62 distal to the substrate 1, and the third insulation layer 8 is located between the reflection enhancement layer 4 and the second electrode layer 62. The first insulation layer 5, the second insulation layer 7, and the third insulation layer 8 have a same material, and each of the first insulation layer 5, the second insulation layer 7, and the third insulation layer 8 has a thickness of 2.0 µm.

When the touch area TA of the touch substrate has the structure (in which the reflection enhancement layer 4 is set as the outermost layer) as shown in FIG. 4, the reflection enhancement layer 4 is easily affected by the underlying film layers during a sputtering process, which may result in a poor film-forming quality of the reflection enhancement layer 4, and in turn may result in that the moisture and/or dirt is easily formed on the surface of the reflection enhancement layer 4 during a subsequent process. The moisture and the dirt may permeate into the reflection enhancement layer 4 and the layers below the reflection enhancement layer 4, and only a part of moisture and dirt on the surface of the reflection enhancement layer 4 can be removed after being wiped. The moisture and the dirt permeated into the reflection enhancement layer 4 and the layers below the reflection enhancement layer 4 may affect the electrical characteristics of the touch capacitance formed by the touch electrode layer 6, which results in a poor uniformity of the touch capacitance in the touch substrate.

Figure 5:
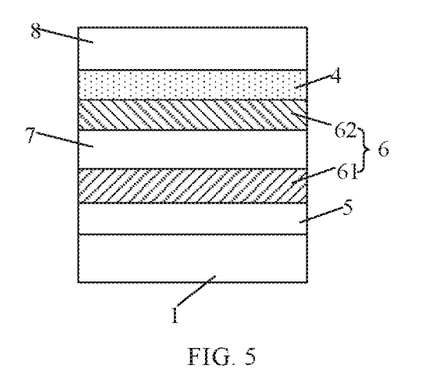
FIG. 5 is a schematic diagram showing a stacked structure of a touch area of a touch substrate according to an embodiment of the present disclosure.

In order to prevent this phenomenon, the touch area TA of the touch substrate according to the present disclosure may instead have the stacked structure in FIG. 5. As shown in FIGS. 3 and 5, the reflection enhancement layer 4 covers the border area BA and the touch area TA. Alternatively, the orthographic projection of the reflection enhancement layer 4 on the substrate 1 overlaps (e.g., completely overlaps) with the orthographic projection of the border area BA and the touch area TA on the substrate 1. A touch electrode layer 6 is formed in the touch area TA and between the substrate 1 and the reflection enhancement layer 4. The touch electrode layer 6 may include a first electrode layer 61 and a second electrode layer 62 located on a side of the first electrode layer 61 distal to the substrate 1. One of the first electrode layer 61 and the second electrode layer 62 is a touch driving electrode layer, and the other of the first electrode layer 61 and the second electrode layer 62 is a touch sensing electrode layer. A first insulation layer 5 is formed between the first electrode layer 61 and the substrate 1. A second insulation layer 7 is formed between the first electrode layer 61 and the second electrode layer 62. A third insulation layer 8 is formed on a side of the second electrode layer 62 distal to the substrate 1. In contrast to FIG. 4, the third insulation layer 8 in FIG. 5 is located on a side of the reflection enhancement layer 4 distal to the substrate 1.

Figure 8:
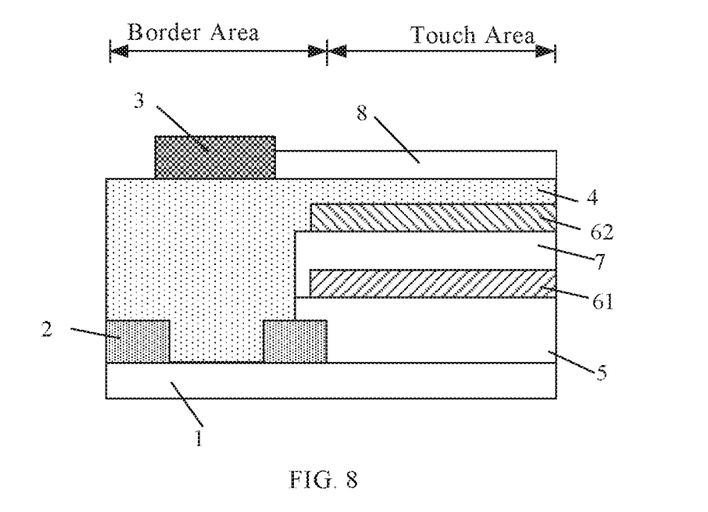
FIG. 8 is a cross-sectional view of the border area and the touch area taken along line BB shown in FIG. 1.

FIG. 8 is a cross-sectional view of the border area and the touch area taken along line BB shown in FIG. 1. Referring to FIG. 8, the reflection enhancement layer 4 in the border area BA and the reflection enhancement layer 4 in the touch area TA are formed as one piece in a same step. In a case where the reflection enhancement layer is arranged to cover the touch area TA and the border area BA, the moisture and the like can be prevented from entering into the touch substrate. However, an insulation layer manufactured at a low temperature may result in poor compactness of the insulation layer, which is not beneficial to blocking the moisture from outside. Therefore, a good antifouling property of the third insulation layer 8 can be realized by selecting the material of the third insulation layer 8. Under the protection of the third insulation layer 8, the moisture and dirt on the touch substrate can be reduced even through the reflection enhancement layer 4 has a poor film-forming quality. The third insulation layer 8 has a high compactness and a large thickness, therefore the moisture and dirt can be prevented from permeating into the third insulation layer 8, and in turn the moisture and dirt can be prevented from affecting the electrical characteristics of the touch capacitance in the touch substrate, thereby ensuring the uniformity of the touch capacitance in the touch substrate. When the touch substrate in which the touch area has the stacked structure shown in FIG. 5 is manufactured, the process steps are not increased compared with FIG. 4.

In an embodiment, the third insulation layer 8 may serve as, for example, a black matrix or a protective layer for R/G/B pixels, and further reduce the difference between the heights of the layers, A material of the third insulation layer 8 includes an organic material such as photoresist, and the thickness of the third insulation layer 8 ranges from 1 µm to 3 µm, e.g., 2 µm. The materials and thicknesses of the first insulation layer 5 and the second insulation layer 7 may be the same as those of the third insulation layer 8.

Figure 6A:
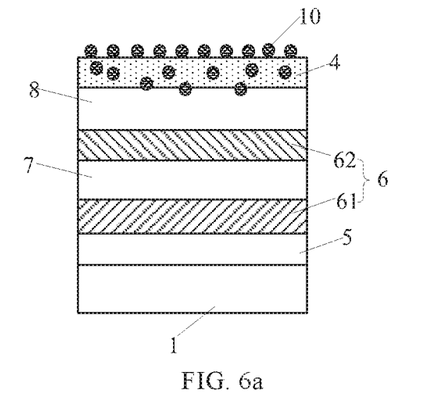
FIG. 6a is a schematic diagram showing a state where moisture and/or dirt is formed on a surface of a reflection enhancement layer in a case where the touch area has the stacked structure as shown in FIG. 4.
Figure 6B:
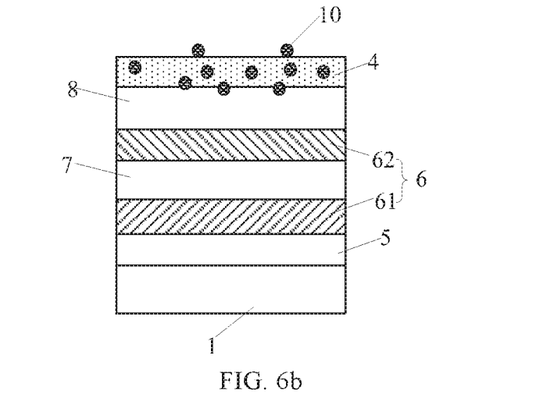
FIG. 6b is a schematic diagram showing a state after the moisture and/or the dirt as shown in FIG. 6a is wiped.
Figure 7A:
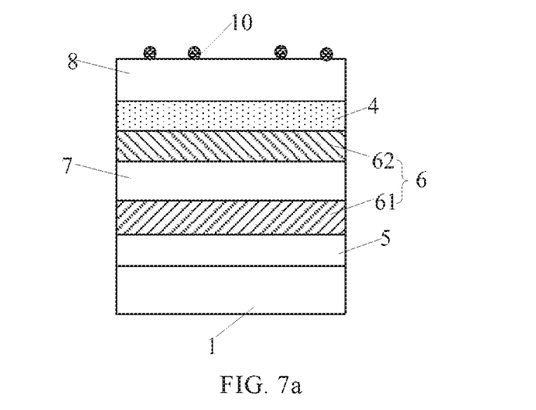
FIG. 7a is a schematic diagram showing a state where moisture and/or dirt is formed on a surface of a third insulation layer in a case where the touch area has the stacked structure shown in FIG. 5.
Figure 7B:
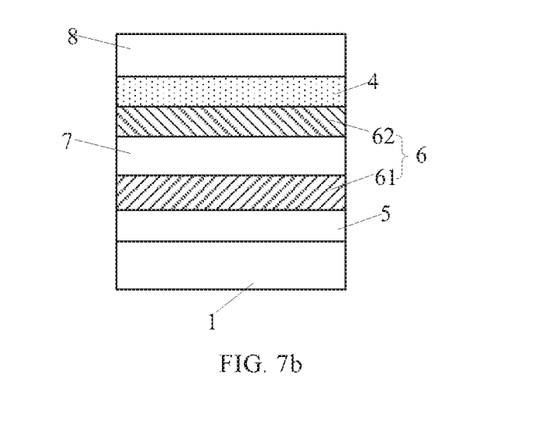
FIG. 7b is a schematic diagram showing a state after the moisture and/or dirt as shown in FIG. 7a is wiped.

FIG. 6a is a schematic diagram showing a state where moisture and/or dirt is formed on a surface of the reflection enhancement layer in a case where the touch area has the stacked structure as shown in FIG. 4. FIG. 6b is a schematic diagram showing a state after the moisture and/or the dirt as shown in FIG. 6a is wiped. FIG. 7a is a schematic diagram showing a state where moisture and/or dirt is formed on a surface of the third insulation layer in a case where the touch area has the stacked structure shown in FIG. 5. FIG. 7b is a schematic diagram showing a state after the moisture and/or dirt as shown in FIG. 7a is wiped. As can be seen from FIGS. 6a to 7b that when the touch area TA has the stacked structure shown in FIG. 4, more moisture and dirt 10 are easily formed on the surface of the reflection enhancement layer 4, as shown in FIG. 6a. After the surface of the reflection enhancement layer 4 is wiped, a part of the moisture and the dirt 10 still remain thereon, as shown in FIG. 6b. When the touch area TA has the stacked structure shown in FIG. 5, as shown in FIG. 7a, relative less moisture and dirt 10 is formed on the surface of the third insulation layer 8 than that in FIG. 6a. After the surface of the third insulation layer 8 is wiped, substantially no moisture and dirt remains thereon, as shown in FIG. 7b. When the touch area TA has the stacked structure shown in FIG. 5, after an 8585 reliability test (in which the touch substrate is placed in an environment with a temperature of 85° C.±5° C. and a humidity of 85±5% RH for 240 hours) is performed on the touch substrate, the test result shows that the touch capacitance formed by the touch electrode layer 6 has a good uniformity.

In FIGS. 4 and 5, the electrode layers in the touch electrode layer 6 may be metal grid electrodes; alternatively, the electrode layers in the touch electrode layer 6 may be transparent electrodes such as those made of indium tin oxide. It should be noted that the structure of the touch electrode layer 6 is not limited to the structure of the touch electrode layer 6 shown in FIGS. 4 and 5. For example, the touch electrode layer 6 may be a single-layer self-capacitance electrode layer.

Table 1 shows a comparison between the optical performance for a touch substrate in the related art and the optical performance for the touch substrate according to the present disclosure. The "first structure" refers to a touch substrate in which the border area. BA has the structure shown in FIG. 3 and the touch area TA has the stacked structure shown in FIG. 4 according to the embodiment of the present disclosure. The "second structure" refers to a touch substrate in which the border area BA has the structure shown in FIG. 3 and the touch area TA has the stacked structure shown in FIG. 5 according to the embodiment of the present disclosure. The color uniformity test (or color consistency test) is configured to test similarity between the color of the light filtering sub-area. IR and the color of the light shielding sub-area SA. LV1 to LV5 indicate the levels of color difference between the color of the light filtering sub-area IR and the color of the light shielding sub-area SA, wherein LV1 indicates the minimum color difference, and LV5 indicates the maximum color difference. ΔL indicates the difference between the lightness of the light filtering sub-area IR and the lightness of the light-shielding sub-area SA.

TABLE 1

|  |  | Related Art | Fisrt Structure | Second Structure |
|---|---|---|---|---|
| Color Consistency Test | Levels | LV5 | LV2 | LV2 |
|  | ΔL | 3.64 | 1.2 | 1.2 |
| Transmittance of Touch Area |  | 86.61% | 83.3% | 84.1% |
| Reflectance of Touch Area |  | 7.13% | 8.48% | 7.46% |
| Haze of Touch Area |  | 1.05% | 1.10% | 1.08% |

As can be seen from Table 1 that the touch substrates having the first structure and the second structure can reduce the difference between the lightness of the light filtering sub-area IR and the lightness of the light shielding sub-area SA, therefore human eyes can hardly distinguish the difference between the color of the light filtering sub-area IR and the color of the light shielding sub-area SA, thereby achieving the uniformity color in the border area BA. In addition, the first and second structures according to the present disclosure have substantially no effect on the light transmittance, reflectance, and haze of the touch area TA.

An embodiment of the present disclosure provides a touch device, which includes the touch substrate according to any one of the embodiments described above. The touch device may further include a sensor at a position corresponding to the light filtering sub-area and located on a side of the light filtering ink layer 3 distal to the substrate 1. The sensor can be a camera, a light sensor, a distance sensor or the like.

In order to enable the touch device to have both the touch function and the display function, the touch device may further include a display panel. The touch substrate is located on a light emitting side of the display panel, the touch area of the touch substrate corresponds to a display area of the display panel, and the border area of the touch substrate corresponds to a non-display area of the display panel.

According to the embodiment of the present disclosure, the color uniformity of the border area BA of the touch substrate can be realized, therefore the light filtering sub-area can be well hidden in the touch device having the touch substrate, thereby providing good visual experience to the users. In addition, in the touch area of the touch substrate, since the insulation layer is formed on the outer side of the reflection enhancement layer, it is beneficial to removing the moisture and dirt on the surface of the insulation layer, thereby ensuring the uniformity of a touch capacitance and the touch effect of the touch device without increasing the process steps.

An embodiment of the present disclosure provides a method for manufacturing a touch substrate including a touch area TA and a border area BA surrounding the touch area TA. The method for manufacturing the touch substrate includes the following steps: forming a light filtering sub-area IR for transmitting light of a predetermined wavelength band and a light shielding sub-area SA surrounding the light filtering sub-area IR in the border area BA, The difference between the lightness of the light-shielding sub-area and the lightness of the light filtering sub-area. IR is less than 3.6.

A light shielding layer 2 is formed on a side of the substrate 1 in the border area BA, and the light shielding layer 2 is located in the light shielding sub-area SA. A through hole 9 is formed at a position in the light shielding layer 2 corresponding to the light filtering sub-area IR. A light filtering ink layer 3 is formed on a side of the light shielding layer 2 distal to the substrate 1. An orthogonal projection of the light filtering ink layer 3 on the substrate 1 at least overlaps with an orthogonal projection of the light filtering sub-area IR on the substrate 1. In an embodiment, an orthographic projection of the through hole 9 on the substrate 1 is located inside the orthographic projection of the light filtering sub-area IR on the substrate 1. The difference between the lightness of the light shielding layer 2 and the lightness of the light filtering ink layer 3 is less than 3.6. For example, the difference between the lightness of the light shielding layer 2 and the lightness of the light filtering ink layer 3 ranges from 0.5 to 2. In an embodiment, the lightness of the light filtering ink layer 3 ranges from 23 to 24.5, and the lightness of the light shielding layer 2 ranges from 24 to 25. In an embodiment, the light shielding layer has a thickness in a range from 1.5 μm to 2.3 μm.

In an embodiment, the light filtering ink layer 3 is formed to fill in the through hole 9 of the light shielding layer 2 and extend onto a surface of the light shielding layer 2 distal to the substrate 1.

In an embodiment, a reflection enhancement layer 4 is formed between the light shielding layer 2 and the light filtering ink layer 3, such that the reflection enhancement layer 4 is formed to fill in the through hole 9 of the light shielding layer 2, and an orthogonal projection of the reflection enhancement layer 4 on the substrate 1 overlaps with an orthogonal projection of the border area. BA on the substrate 1. In an embodiment, the reflectance of the reflection enhancement layer 4 ranges from 1% to 15%.

In an embodiment, a touch electrode layer 6 including a first electrode layer 61 and a second electrode layer 62 is formed on the side of the substrate 1 in the touch area TA. An insulation layer 8 is formed on a surface of the touch electrode layer 6 distal to the substrate 1. The reflection enhancement layer 4 is formed on a surface of the insulation layer 8 distal to the substrate 1. The insulation layer 8 includes a material such as photoresist. The insulation layer has a thickness in a range from 1 μm to 3 μm.

In an embodiment, a touch electrode layer 6 including a first electrode layer 61 and a second electrode layer 62 is formed on the side of the substrate 1 in the touch area TA. The reflection enhancement layer 4 is formed on the surface of the touch electrode layer 6 distal to the substrate 1. An insulation layer 8 is formed on a surface of the reflection enhancement layer 4 distal to the substrate 1.

The touch substrate manufactured by the manufacturing method of the touch substrate disclosed by the embodiment of the present disclosure can well hide the light filtering sub-area IR in the border area, thereby providing good visual experience to the users. In addition, in the touch area of the touch substrate, the insulation layer is formed on the outer side of the reflection enhancement layer, which is beneficial to removing the moisture and dirt on the surface of the insulation layer, thereby ensuring the uniformity of a touch capacitance and the touch effect of the touch device without increasing the process steps.

It should be understood that the above implementations are merely exemplary embodiments for the purpose of illustrating the principles of the present disclosure, however, the present disclosure is not limited thereto. It will be apparent to those skilled in the art that various changes and modifications can be made without departing from the spirit and essence of the present disclosure, which are also to be regarded as falling within the scope of the present disclosure

What is claimed is:

1. A touch substrate, comprising a touch area and a border area surrounding the touch area, wherein the border area comprises a light filtering sub-area for transmitting light of a predetermined wavelength band and a light shielding sub-area surrounding the light filtering sub-area, and
a difference between lightness of the light shielding sub-area and lightness of the light filtering sub-area is less than 3.6.

2. The touch substrate according to claim 1, wherein
the border area of the touch substrate comprises a substrate, a light shielding layer and a light filtering ink layer that are on a side of the substrate,
the light shielding layer is in the light shielding sub-area, and a through hole is at a position in the light shielding layer corresponding to the light filtering sub-area,
the light filtering ink layer is on a side of the light shielding layer distal to the substrate, and an orthographic projection of the through hole on the substrate is inside an orthographic projection of the light filtering ink layer on the substrate, and
a difference between lightness of the light shielding layer and lightness of the light filtering ink layer is less than 3.6.

3. The touch substrate according to claim 2, wherein the difference between the lightness of the light shielding layer and the lightness of the light filtering ink layer ranges from 0.5 to 2.

4. The touch substrate according to claim 2, wherein the lightness of the light filtering ink layer ranges from 23 to 24.5, and the lightness of the light shielding layer ranges from 24 to 25.

5. The touch substrate according to claim 4, wherein the light shielding layer has a thickness in a range from 1.5 μm to 2.3 μm.

6. The touch substrate according to claim 2, wherein
the light filtering ink layer is in the through hole of the light shielding layer and extends onto a surface of the light shielding layer distal to the substrate.

7. The touch substrate according to claim 2, further comprising a reflection enhancement layer, wherein
the reflection enhancement layer is between the light shielding layer and the light filtering ink layer,
the reflection enhancement layer is at least in the through hole of the light shielding layer, and
the orthographic projection of the through hole on the substrate is inside an orthographic projection of the reflection enhancement layer on the substrate.

8. The touch substrate according to claim 7, wherein a reflectance of the reflection enhancement layer ranges from 1% to 15%.

9. The touch substrate according to claim 7, wherein the touch area of the touch substrate comprises:
a touch electrode layer, on the side of the substrate,
an insulation layer, on a surface of the touch electrode layer distal to the substrate, and
the reflection enhancement layer, on a surface of the insulation layer distal to the substrate, the orthographic projection of the reflection enhancement layer on the substrate overlapping with an orthographic projection of the touch area and the border area on the substrate.

10. The touch substrate according to claim 7, wherein the touch area of the touch substrate comprises:
a touch electrode layer, on the side of the substrate,
the reflection enhancement layer, on a surface of the touch electrode layer distal to the substrate, the orthographic projection of the reflection enhancement layer on the substrate overlapping with an orthographic projection of the touch area and the border area on the substrate, and
an insulation layer, on a surface of the reflection enhancement layer distal to the substrate.

11. The touch substrate according to claim 9, wherein a material of the insulation layer comprises photoresist.

12. The touch substrate according to claim 11, wherein the insulation layer has a thickness in a range from 1 μm to 3 μm.

13. A touch device comprising the touch substrate according to claim 1.

14. A method for manufacturing a touch substrate, wherein the touch substrate comprises a touch area and a border area surrounding the touch area, and the method comprises:
forming a light filtering sub-area for transmitting light of a predetermined wavelength band and a light shielding sub-area surrounding the light filtering sub-area in the border area, and
setting a difference between lightness of the light shielding sub-area and lightness of the light filtering sub-area to be less than 3.6.

15. The method according to claim 14, wherein forming the light filtering sub-area for transmitting light of the predetermined wavelength band and the light shielding sub-area surrounding the light filtering sub-area in the border area comprises:

providing a substrate;

forming a light shielding layer on a side of the substrate in the border area, wherein the light shielding layer is formed in the light shielding sub-area and a through hole is formed at a position of the light shielding layer corresponding to the light filtering sub-area; and forming a light filtering ink layer on a side of the light shielding layer distal to the substrate, wherein an orthographic projection of the through hole on the substrate is inside an orthographic projection of the light filtering ink layer on the substrate, and wherein a difference between lightness of the light shielding layer and lightness of light filtering ink layer is less than 3.6.

16. The method according to claim 15, wherein the difference between the lightness of the light shielding layer and the lightness of the light filtering ink layer ranges from 0.5 to 2.

17. The method according to claim 15, wherein the light filtering ink layer is formed to fill in the through hole of the light shielding layer and extend onto a surface of the light shielding layer distal to the substrate.

18. The method according to claim 15, further comprising:

forming a reflection enhancement layer between the light shielding layer and the light filtering ink layer, such that the reflection enhancement layer is formed to fill in the through hole of the light shielding layer and the orthographic projection of the through hole on the substrate is inside an orthographic projection of the reflection enhancement layer on the substrate.

19. The method according to claim 18, further comprising:

forming a touch electrode layer on the side of the substrate in the touch area;

forming an insulation layer on a surface of the touch electrode layer distal to the substrate; and forming the reflection enhancement layer on a surface of the insulation layer distal to the substrate, such that the orthographic projection of the reflection enhancement layer on the substrate overlaps with an orthographic projection of the touch area and the border area on the substrate.

20. The method according to claim 18, further comprising:

forming a touch electrode layer on the side of the substrate in the touch area;

forming the reflection enhancement layer on a surface of the touch electrode layer distal to the substrate, such that the orthographic projection of the reflection enhancement layer on the substrate overlaps with an orthographic projection of the touch area and the border area on the substrate; and forming an insulation layer on a surface of the reflection enhancement layer distal to the substrate.

* * * * *